US012121931B2

(12) United States Patent
Nakatani et al.

(10) Patent No.: US 12,121,931 B2
(45) Date of Patent: Oct. 22, 2024

(54) ULTRAVIOLET CURING APPARATUS AND ULTRAVIOLET CURING METHOD

(71) Applicant: L'Air Liquide, Société Anonyme pour l'Etude et l'Exploitation des Procédés Georges Claude, Paris (FR)

(72) Inventors: Kohei Nakatani, Tokyo (JP); Tadasu Nakatani, Tokyo (JP); Eiichi Mizutani, Tokyo (JP)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 164 days.

(21) Appl. No.: 17/884,197

(22) Filed: Aug. 9, 2022

(65) Prior Publication Data

US 2023/0049949 A1 Feb. 16, 2023

(30) Foreign Application Priority Data

Aug. 10, 2021 (JP) ................................ 2021-130425

(51) Int. Cl.
*B05D 3/06* (2006.01)
*B05D 3/04* (2006.01)

(52) U.S. Cl.
CPC ........... *B05D 3/066* (2013.01); *B05D 3/0406* (2013.01); *B05D 3/0486* (2013.01); *B05D 3/067* (2013.01)

(58) Field of Classification Search
CPC .... B05D 3/066; B05D 3/0406; B05D 3/0486; B05D 3/067; B05D 3/0466; B05D 2252/02
See application file for complete search history.

(56) References Cited

U.S. PATENT DOCUMENTS

2007/0109333 A1* 5/2007 Coeuret .................... F26B 3/28 347/1

FOREIGN PATENT DOCUMENTS

JP H05237849 A * 9/1993 ............ B29C 36/10
JP 4763618 B2 8/2011

OTHER PUBLICATIONS

JP-H05237849-A English translation. (Year: 1993).*

* cited by examiner

*Primary Examiner* — Hai Y Zhang
(74) *Attorney, Agent, or Firm* — Elwood L. Haynes

(57) ABSTRACT

An ultraviolet curing apparatus having: a roller for guiding a film coated with a resin; a first nitrogen gas introduction port and a second nitrogen gas introduction port for introducing nitrogen gas; a UV irradiation portion for irradiating the film with ultraviolet rays from between the first nitrogen gas introduction port and the second nitrogen gas introduction port; an oxygen concentration meter for measuring an oxygen concentration between the film and the UV irradiation portion; an air introduction port for introducing air between the film and the UV irradiation portion; and a controller for controlling at least any one of: an amount of air introduced from the air introduction port, an amount of nitrogen gas introduced from the first nitrogen gas introduction port, and an amount of nitrogen gas introduced from the second nitrogen gas introduction port, so that the oxygen concentration is within a preset oxygen concentration set range.

4 Claims, 5 Drawing Sheets

ULTRAVIOLET CURING APPARATUS AND ULTRAVIOLET CURING METHOD

CROSS REFERENCE TO RELATED APPLICATIONS

This application claims the benefit of priority under 35 U.S.C. § 119 (a) and (b) to Japanese Patent Application No. JP 2021-130425, filed Aug. 10, 2021, the entire contents of which are incorporated herein by reference.

TECHNICAL FIELD

The present invention relates to an ultraviolet curing apparatus and an ultraviolet curing method.

BACKGROUND ART

Ultraviolet curing technology is widely known in general, where a monomer is irradiated with ultraviolet rays to induce a photopolymerization reaction, and the monomer is converted to a polymer and cured.

In this ultraviolet curing technology, it is important to appropriately control the energy of the ultraviolet rays irradiated, and also the oxygen concentration and nitrogen concentration at a part from which ultraviolet rays are irradiated.

If variations arise in the energy of the ultraviolet rays irradiated, and the oxygen concentration and nitrogen concentration at the part from which ultraviolet rays are irradiated, the photopolymerization reaction is excessively restricted or progresses excessively.

As a result, there are variations in product quality, leading to a reduction in yield.

Conventionally, technology for appropriately controlling the environment at the part from which ultraviolet rays are irradiated is being developed.

Patent Document 1, which is an example of the prior art, describes controlling a residual oxygen content in a mixed gas inside a chamber for crosslinking a coating by means of ultraviolet rays or an electron beam.

Patent Document 2, which is an example of the prior art, describes technology for modifying and adjusting a flow rate of nitrogen gas for preventing crosslinking defects, which is supplied into a quartz tube in which UV-crosslinking is performed, in accordance with a travel speed of a linear body to be UV-cross-linked.

PRIOR ART DOCUMENTS

Patent Documents

Patent Document 1 JP 4763618 B2
Patent Document 2 JP H5-237849 A

SUMMARY OF THE INVENTION

Problems to be Solved by the Invention

There is room for improvement in controlling the environment of the part from which ultraviolet rays are irradiated during ultraviolet curing.

The present invention has been devised in light of the situation described above, and the objective thereof lies in providing technology for controlling a crosslinking reaction of a resin.

Means for Solving the Problems

One aspect of the present invention, which achieves the objective by solving the abovementioned problem, lies in an ultraviolet curing apparatus comprising: a roller for guiding a film coated with a resin; a first nitrogen gas introduction port and a second nitrogen gas introduction port for introducing nitrogen gas; a UV irradiation portion for irradiating the film with ultraviolet rays from between the first nitrogen gas introduction port and the second nitrogen gas introduction port; an oxygen concentration meter for measuring an oxygen concentration between the film and the UV irradiation portion; an air introduction port for introducing air between the film and the UV irradiation portion; and a controller for controlling at least any one of: an amount of air introduced from the air introduction port, an amount of nitrogen gas introduced from the first nitrogen gas introduction port, and an amount of nitrogen gas introduced from the second nitrogen gas introduction port, so that the oxygen concentration is within a preset oxygen concentration set range.

In one aspect of the present invention, the controller of the ultraviolet curing apparatus having the configuration above comprises: an input unit for inputting an oxygen concentration value measured by means of the oxygen concentration meter; a memory unit for storing the preset oxygen concentration set range; a determination unit for determining whether or not the oxygen concentration value is within the oxygen concentration set range; and a signal generation unit for generating and outputting a control signal to control a degree of opening of a gas valve on the basis of the determination of the determination unit.

In one aspect of the present invention, the oxygen concentration set range is between 500 ppm and 1000 ppm in the ultraviolet curing apparatus having the configuration above.

Alternatively, in one aspect of the present invention, the oxygen concentration set range is between 5000 ppm and 5% in the ultraviolet curing apparatus having the configuration above.

A different aspect of the present invention lies in an ultraviolet curing method for curing a film coated with a resin by irradiating the film with ultraviolet rays from between two nitrogen gas introduction ports, the ultraviolet curing method comprising: introducing nitrogen gas from each of the two nitrogen gas introduction ports; introducing air from an air introduction port between the film and a part for irradiating ultraviolet rays; measuring an oxygen concentration between the film and the part for irradiating ultraviolet rays; controlling at least either one of: an amount of air introduced from the air introduction port, and an amount of nitrogen gas introduced from each of the two nitrogen gas introduction ports, so that the oxygen concentration is within a preset oxygen concentration set range; guiding the film; and irradiating the film with ultraviolet rays from between the two nitrogen gas introduction ports.

In one aspect of the present invention, the control in the ultraviolet curing method having the configuration above comprises: inputting the measured oxygen concentration value; determining whether or not the oxygen concentration value is within the oxygen concentration set range; and generating and outputting a control signal to control a degree of opening of a gas valve on the basis of the determination.

In one aspect of the present invention, the oxygen concentration set range is between 500 ppm and 1000 ppm in the ultraviolet curing method having the configuration above.

In one aspect of the present invention, the oxygen concentration set range is between 5000 ppm and 5% in the ultraviolet curing method having the configuration above.

Advantage of the Invention

The present invention makes it possible to control a crosslinking reaction of a resin.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

An embodiment of the present invention will be described below with reference to the appended drawings.

However, the present invention should not be construed as being limited by the description of the following embodiment.

Embodiment 1

Figure 1:
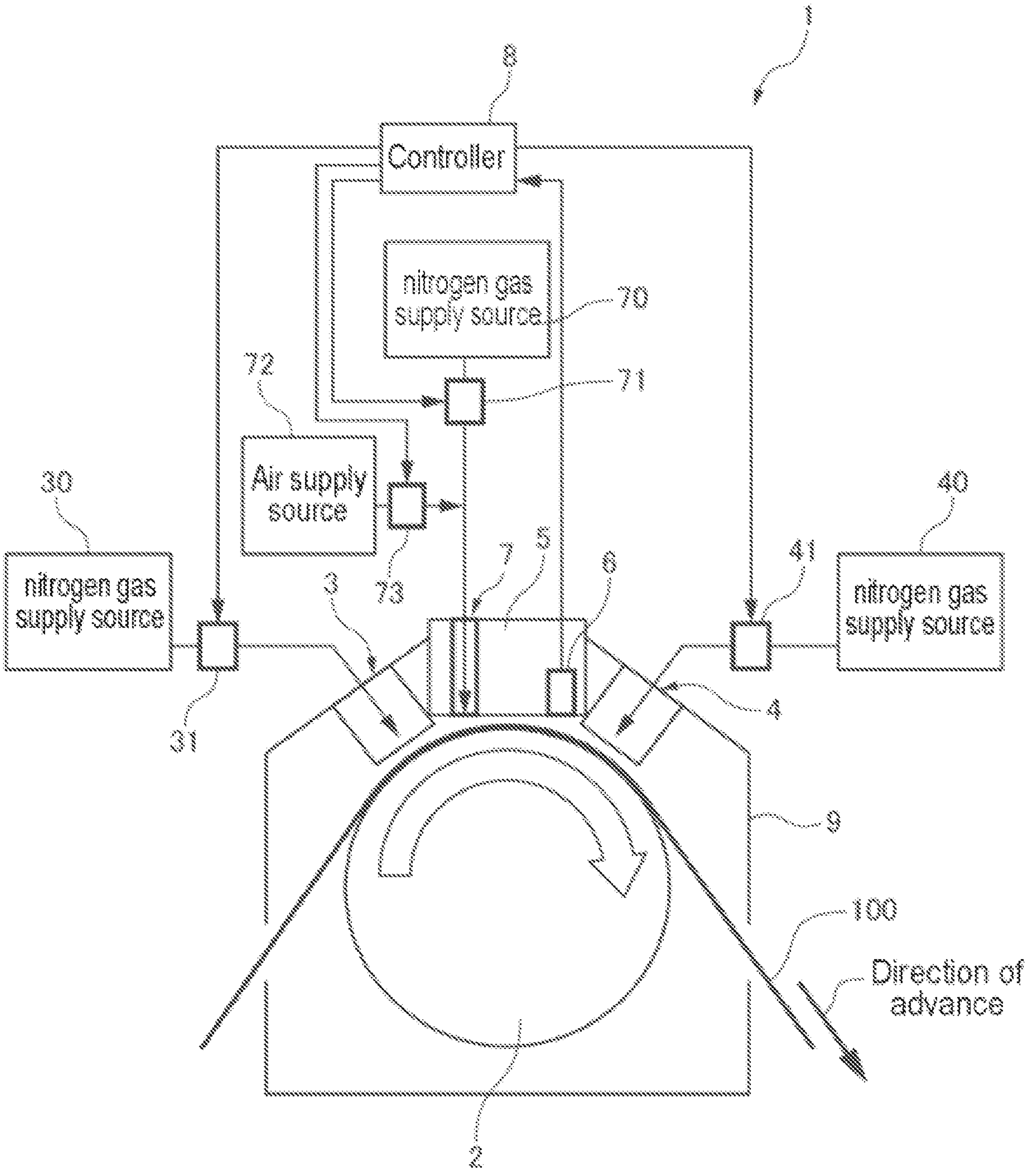
FIG. 1 is a view in cross section showing the configuration of an ultraviolet curing apparatus according to an embodiment.

FIG. 1 is a view in cross section showing the configuration of an ultraviolet curing apparatus 1 according to an embodiment of the present invention.

The ultraviolet curing apparatus 1 shown in FIG. 1 comprises: a roller 2, a first nitrogen gas introduction port 3, a second nitrogen gas introduction port 4, a UV irradiation portion 5, an oxygen concentration meter 6, an air introduction port 7, a controller 8, and a processing chamber 9.

The roller 2 guides a film 100 to the processing chamber 9.

The film 100 advances at a fixed speed in a direction of advance shown by the arrow in FIG. 1.

The film 100 is coated with a resin, which is a monomer, and the monomer is converted to a polymer and cured by means of a photopolymerization reaction induced by ultraviolet rays which are irradiated.

The first nitrogen gas introduction port 3 and the second nitrogen gas introduction port 4 are gas introduction ports for introducing nitrogen gas into the processing chamber 9.

The first nitrogen gas introduction port 3 and the second nitrogen gas introduction port 4 which are set apart from each other are provided on both sides of a part for irradiating ultraviolet rays, thus making it possible to restrict the ingress of external air.

A nitrogen gas supply source 30 is connected to the first nitrogen gas introduction port 3, and a nitrogen gas supply source 40 is connected to the second nitrogen gas introduction port 4.

A gas valve 31 is provided between the first nitrogen gas introduction port 3 and the nitrogen gas supply source 30, and a gas valve 41 is provided between the second nitrogen gas introduction port 4 and the nitrogen gas supply source 40.

It should be noted that FIG. 1 illustrates the nitrogen gas supply source 30 and the nitrogen gas supply source 40, but the present invention is not limited thereto.

For example, a single nitrogen gas supply source may be connected to both the first nitrogen gas introduction port 3 and the second nitrogen gas introduction port 4.

A nitrogen gas cylinder may be given as an example of the nitrogen gas supply source 30 and the nitrogen gas supply source 40.

The UV irradiation portion 5 irradiates the film 100 with ultraviolet rays between the first nitrogen gas introduction port 3 and the second nitrogen gas introduction port 4.

Here, the irradiated ultraviolet rays may be set at a constant energy throughout the process so that the film 100 can be uniformly irradiated.

The oxygen concentration meter 6 is a gas measurement device for measuring an oxygen concentration in a space inside the processing chamber 9 between the film 100 and the UV irradiation portion 5.

The air introduction port 7 is a gas introduction port for introducing air into the space inside the processing chamber 9 between the film 100 and the UV irradiation portion 5.

A nitrogen gas supply source 70 and an air supply source 72 are connected to the air introduction port 7.

A gas valve 71 is provided between the air introduction port 7 and the nitrogen gas supply source 70.

The air supply source 72 is connected by way of a gas valve 73 between the air introduction port 7 and the gas valve 71.

A nitrogen gas cylinder may be given as an example of the nitrogen gas supply source 70.

An air cylinder may be given as an example of the air supply source 72.

The controller 8 controls at least any one of: an amount of air introduced from the air introduction port 7, an amount of nitrogen gas introduced from the first nitrogen gas introduction port 3, and an amount of nitrogen gas introduced from the second nitrogen gas introduction port 4, on the basis of the oxygen concentration in the space inside the processing chamber 9 between the film 100 and the UV irradiation portion 5, as measured by the oxygen concentration meter 6.

Figure 2:
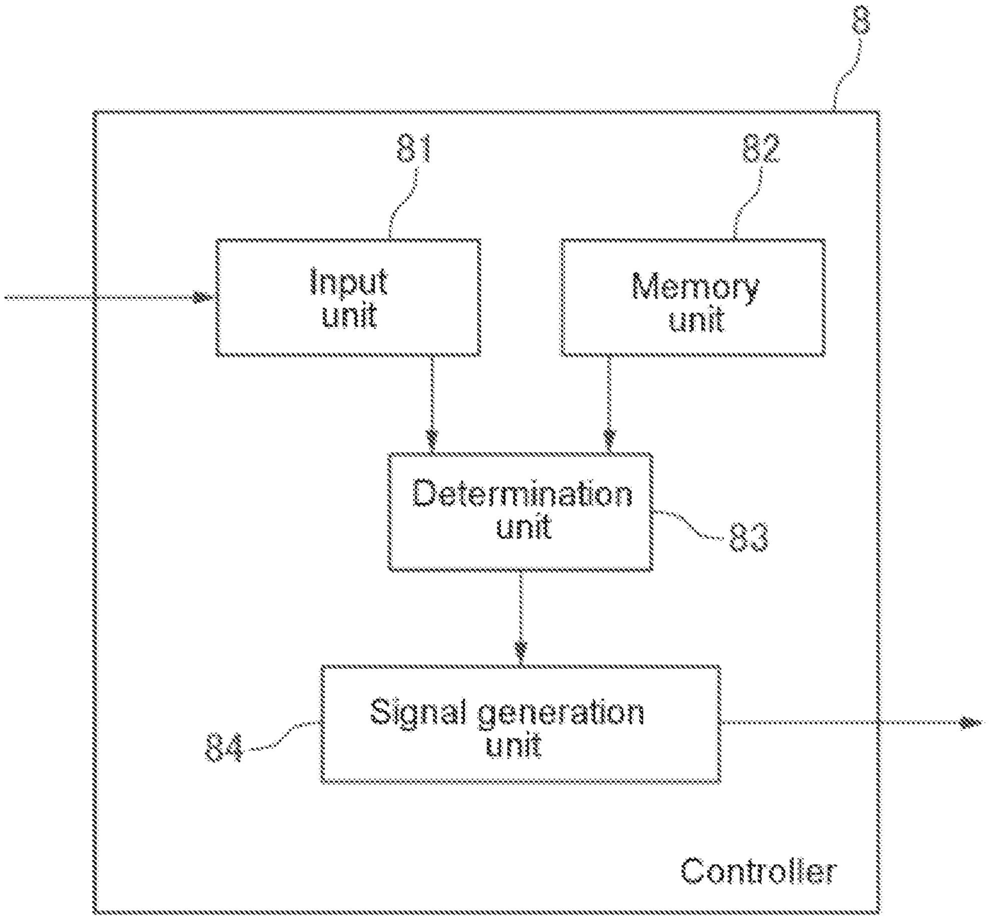
FIG. 2 is a functional block diagram showing the configuration of a controller shown in FIG. 1.

FIG. 2 is a functional block diagram showing the configuration of the controller 8 shown in FIG. 1.

The controller 8 shown in FIG. 2 comprises: an input unit 81, a memory unit 82, a determination unit 83, and a signal generation unit 84.

The input unit 81 is an input interface which is connected to the oxygen concentration meter 6 and receives as input an oxygen concentration value which is a result measured by means of the oxygen concentration meter 6.

The oxygen concentration value which is the measurement result of the oxygen concentration meter 6 is input to the input unit 81.

The memory unit 82 stores a preset oxygen concentration set range.

The memory unit 82 may be configured by a recording medium such as a semiconductor memory or a magnetic disk.

Here, the oxygen concentration set range is preferably set at between 500 ppm and 1000 ppm, or between 5000 ppm and 5%.

Setting an oxygen concentration set range such as this makes it possible to prevent cracking or warping of the film 100.

The determination unit 83 determines whether or not the oxygen concentration value input to the input unit 81 from the oxygen concentration meter 6 is within the oxygen concentration set range stored in the memory unit 82.

The determination unit 82 may be configured by a processor such as a microprocessing unit (MPU) or a central processing unit (CPU).

The signal generation unit 84 generates and outputs control signals for controlling a degree of opening of the gas valves on the basis of the determination of the determination unit 83.

The gas valves are provided between the gas introduction port to be controlled by the controller 8, and the relevant gas supply source.

Specifically, the gas valve to be controlled by the controller 8 is at least any one of: the gas valve 71 between the air introduction port 7 and the nitrogen gas supply source 70 connected to the air introduction port 7, the gas valve 73 connected between the air introduction port 7 and the gas valve 71, the gas valve 31 between the first nitrogen gas introduction port 3 and the nitrogen gas supply source 30 connected to the first nitrogen gas introduction port 3, and the gas valve 41 between the second nitrogen gas introduction port 4 and the nitrogen gas supply source 40 connected to the second nitrogen gas introduction port 4.

If the amount of air introduced from the air introduction port 7 increases when the amount of nitrogen gas introduced from the first nitrogen gas introduction port 3 and the amount of nitrogen gas introduced from the second nitrogen gas introduction port 4 are constant, there is a fall in the nitrogen concentration in a space where the oxygen concentration meter 6 takes measurements, and the oxygen concentration rises, or if the amount of air introduced from the air introduction port 7 decreases in the same situation, there is a rise in the nitrogen concentration in the space where the oxygen concentration meter 6 takes measurements, and the oxygen concentration falls.

If the amount of nitrogen gas introduced from the first nitrogen gas introduction port 3 increases when the amount of nitrogen gas introduced from the second nitrogen gas introduction port 4 and the amount of air introduced from the air introduction port 7 are constant, there is a rise in the nitrogen concentration in the space where the oxygen concentration meter 6 takes measurements, and the oxygen concentration falls, or if the amount of nitrogen gas introduced from the first nitrogen gas introduction port 3 decreases in the same situation, there is a fall in the nitrogen concentration in the space where the oxygen concentration meter 6 takes measurements, and the oxygen concentration rises.

If the amount of nitrogen gas introduced from the second nitrogen gas introduction port 4 increases when the amount of nitrogen gas introduced from the first nitrogen gas introduction port 3 and the amount of air introduced from the air introduction port 7 are constant, there is a rise in the nitrogen concentration in the space where the oxygen concentration meter 6 takes measurements, and the oxygen concentration falls, or if the amount of nitrogen gas introduced from the second nitrogen gas introduction port 4 decreases in the same situation, there is a fall in the nitrogen concentration in the space where the oxygen concentration meter 6 takes measurements, and the oxygen concentration rises.

Figure 3:
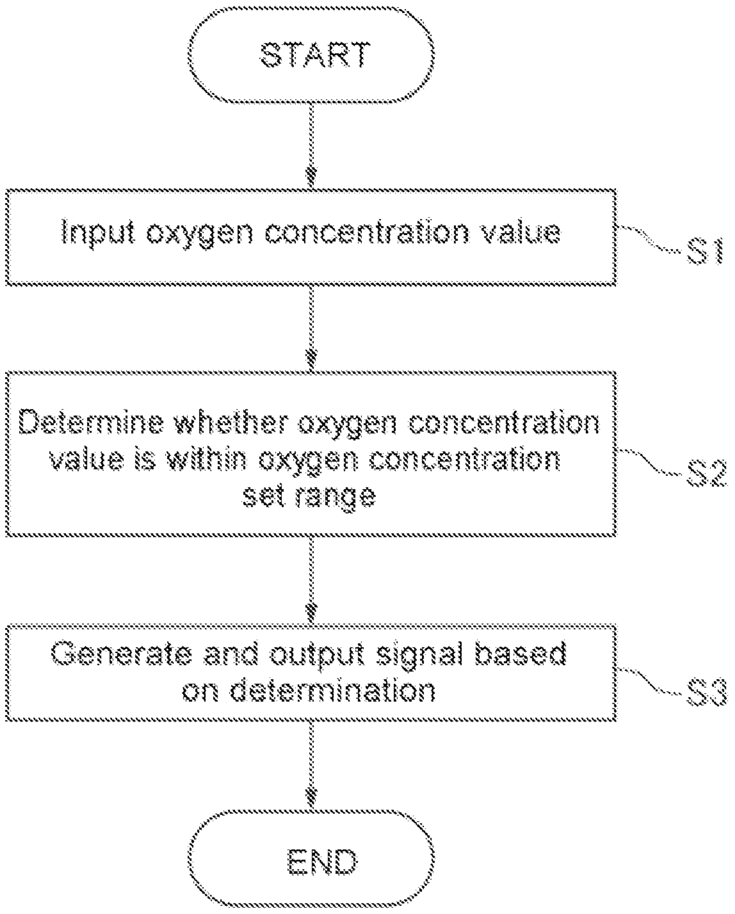
FIG. 3 is a flowchart showing operations of the controller shown in FIG. 2.

FIG. 3 is a flowchart showing operations of the controller 8 shown in FIG. 2.

The controller 8 shown in FIG. 2 first of all starts the processing, and when the oxygen concentration value, which is the result measured by means of the oxygen concentration meter 6, is input to the input unit 81 (S1), the determination unit 83 determines whether or not that oxygen concentration value is within the oxygen concentration set range stored in the memory unit 82 (S2).

The signal generation unit 84 then generates and outputs a control signal to control a degree of opening of the gas valve(s) on the basis of the determination result of the determination unit 83 (S3), and the processing ends.

For example, if the oxygen concentration value which is the result measured by means of the oxygen concentration meter 6 is lower than the oxygen concentration set range, the signal generation unit 84 generates and outputs a control signal to control the degree of opening of the gas valve between the gas introduction port to be controlled by the controller 8, and the relevant gas supply source, so that the oxygen concentration rises.

Alternatively, if the oxygen concentration value which is the result measured by means of the oxygen concentration meter 6 is higher than the oxygen concentration set range, the signal generation unit 84 generates and outputs a control signal to control the degree of opening of the gas valve between the gas introduction port to be controlled by the controller 8, and the relevant gas supply source, so that the oxygen concentration falls.

The degree of opening of the gas valves should be proportionally controlled by means of the control signal.

The controller 8 thus controls at least any one of the amount of air introduced from the air introduction port 7, the amount of nitrogen gas introduced from the first nitrogen gas introduction port 3, and the amount of nitrogen gas introduced from the second nitrogen gas introduction port 4 so that a crosslinking reaction of the resin in the film 100 can be controlled.

It should be noted that the controller 8 may continue the control until the oxygen concentration value is within the oxygen concentration set range.

Figure 4:
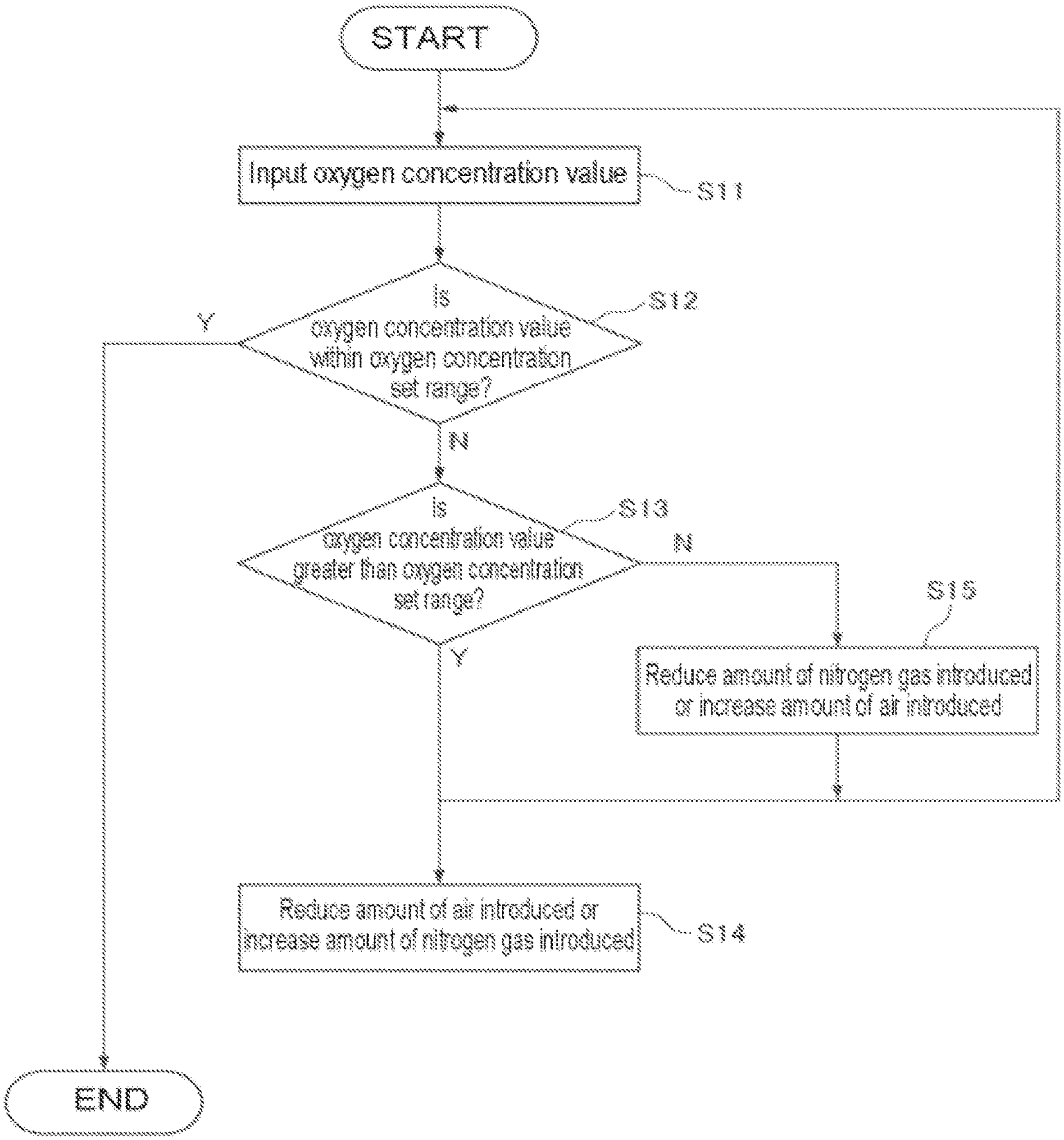
FIG. 4 is another flowchart showing operations of the controller shown in FIG. 2.

FIG. 4 is another flowchart showing operations of the controller 8 shown in FIG. 2.

The controller 8 shown in FIG. 2 first of all starts the processing, and when the oxygen concentration value, which is the result measured by means of the oxygen concentration meter 6, is input to the input unit 81 (S11), the determination unit 83 determines whether or not that oxygen concentration value is within the oxygen concentration set range stored in the memory unit 82 (S12).

If the oxygen concentration value is within the oxygen concentration set range stored in the memory unit 82 (S12: Y), the processing ends.

If the oxygen concentration value is not within the oxygen concentration set range stored in the memory unit 82 (S12: N), the determination unit 83 further determines whether or not the oxygen concentration value is greater than the oxygen concentration set range stored in the memory unit 82 (S13).

If the oxygen concentration value is greater than the oxygen concentration set range stored in the memory unit 82 (S13: Y), the signal generation unit 84 generates and outputs a control signal to control the degree of opening of the gas valve(s), and thereby reduces the amount of air introduced or increases the amount of nitrogen gas introduced (S14), and the processing returns to S11.

If the oxygen concentration value is not greater than the oxygen concentration set range stored in the memory unit 82 (S13: N), the signal generation unit 84 generates and outputs a control signal to control the degree of opening of the gas valve(s), and thereby increases the amount of air introduced or reduces the amount of nitrogen gas introduced (S15), and the processing returns to S11.

According to the flowchart shown in FIG. 4, automatic control is possible until the oxygen concentration value is within the oxygen concentration set range.

Furthermore, the present invention is not limited to the ultraviolet curing apparatus 1 shown in FIG. 1.

Figure 5:
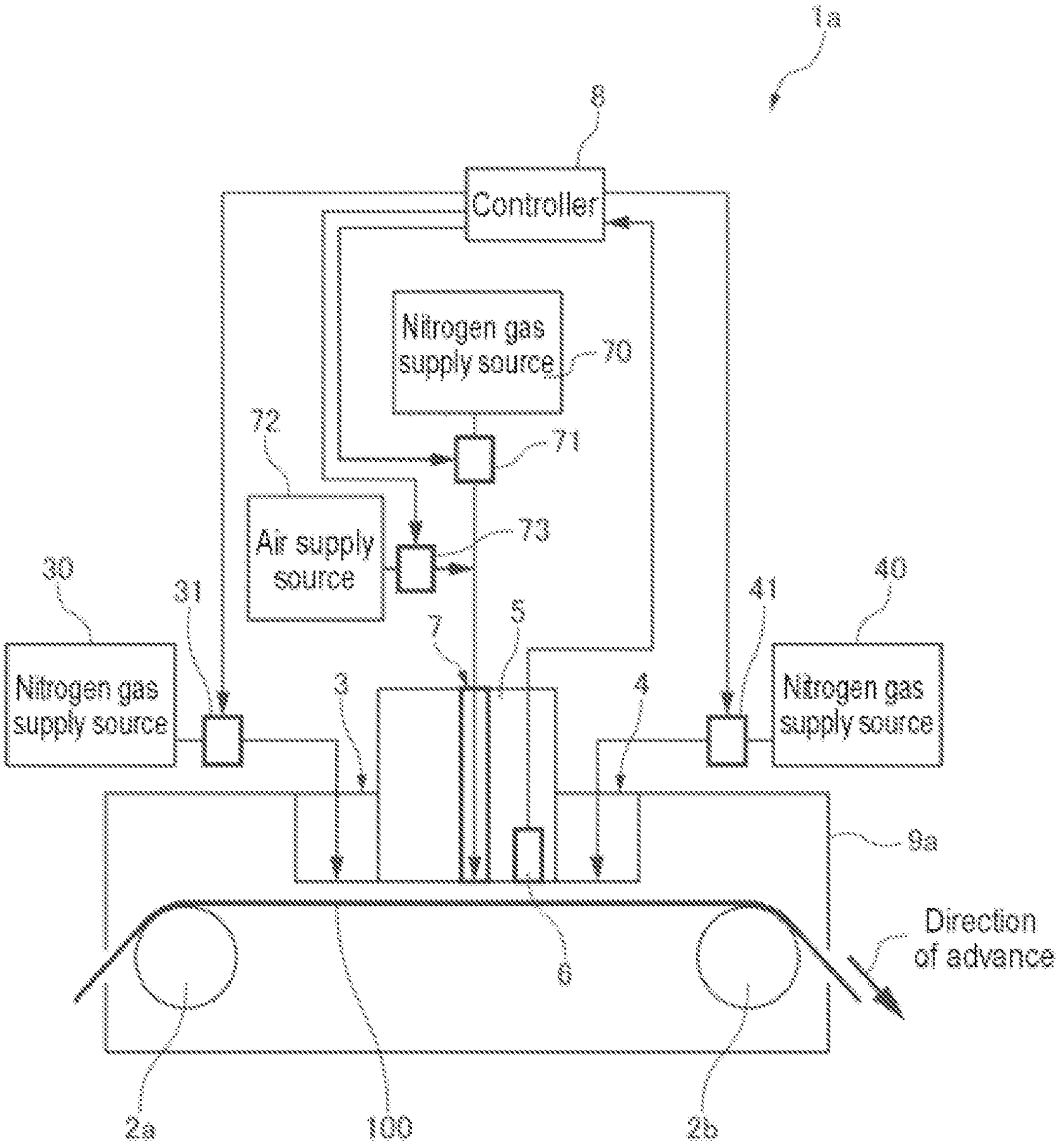
FIG. 5 is a view in cross section showing the configuration of an ultraviolet curing apparatus according to a variant example of the embodiment.

FIG. 5 is a view in cross section showing the configuration of an ultraviolet curing apparatus 1*a* according to a variant example of the embodiment of the present invention.

The ultraviolet curing apparatus 1*a* shown in FIG. 5 comprises: a roller 2*a* and a roller 2*b*, the first nitrogen gas introduction port 3 and the second nitrogen gas introduction port 4, the UV irradiation portion 5, the oxygen concentration meter 6, the air introduction port 7, the controller 8, and a processing chamber 9*a*.

The ultraviolet curing apparatus 1*a* shown in FIG. 5 differs from the ultraviolet curing apparatus 1 shown in FIG. 1 in that two rollers for guiding the film 100 are provided, i.e., instead of the roller 2, the roller 2*a* and the roller 2*b* are provided, and in that, instead of the processing chamber 9, the processing chamber 9*a* having a different shape is provided, but the rest of the configuration is the same.

The roller 2*a* and the roller 2*b* are arranged so that a surface irradiated with the ultraviolet rays from the UV irradiation portion 5, i.e., the film 100, is flat, and so as to be at substantially the same height, taking the UV irradiation portion 5 as a reference.

The ultraviolet curing apparatus 1*a* shown in FIG. 5 allows a region irradiated with the ultraviolet rays from the UV irradiation portion 5 to be set flat, enabling the film 100 to be uniformly irradiated with the ultraviolet rays.

As described above, this embodiment makes it possible to control the crosslinking reaction of the resin.

Furthermore, the crosslinking reaction of the resin can be appropriately controlled in accordance with material characteristics of the resin.

Additionally, this control of the crosslinking reaction of the resin can also be performed automatically.

It should be noted that the present invention is not limited to the ultraviolet curing apparatuses 1, 1*a*.

The present invention also includes an ultraviolet curing method for curing a film coated with a resin by irradiating the film with ultraviolet rays from between two nitrogen gas introduction ports.

That is to say, the present invention also includes an ultraviolet curing method for curing the film 100 coated with a resin by irradiating the film 100 with ultraviolet rays from between the first nitrogen gas introduction port 3 and the second nitrogen gas introduction port 4, the ultraviolet curing method comprising: introducing nitrogen gas from each of the first nitrogen gas introduction port 3 and the second nitrogen gas introduction port 4; introducing air from the air introduction port 7 between the film 100 and a part for irradiating ultraviolet rays; measuring the oxygen concentration between the film 100 and the part for irradiating ultraviolet rays; controlling at least either one of: the amount of air introduced from the air introduction port 7, and the amount of nitrogen gas introduced from each of the first nitrogen gas introduction port 3 and the second nitrogen gas introduction port 4, so that the oxygen concentration is within the preset oxygen concentration set range; guiding the film 100; and irradiating the film 100 with ultraviolet rays from between the first nitrogen gas introduction port 3 and the second nitrogen gas introduction port 4.

Furthermore, ultraviolet curing apparatuses were described in this embodiment, but the present invention is not limited thereto.

The present invention may also be applied to curing of a resin by irradiation of an electron beam, and may also be applied in order to prevent ozone from being generated.

Alternatively, the present invention makes it possible to prevent colouring that accompanies oxidation in a heating portion during resin moulding, or to prevent odours from being generated.

It should be noted that the present invention is not limited to the embodiment described above, and also includes a number of variant examples in which components are added to the configuration described above, or removed therefrom, or else substituted.

KEY TO SYMBOLS

1, 1*a* ultraviolet curing apparatus
2, 2*a*, 2*b* roller
3 first nitrogen gas introduction port
30 nitrogen gas supply source
31 gas valve
4 second nitrogen gas introduction port
40 nitrogen gas supply source
41 gas valve
5 UV irradiation portion
6 oxygen concentration meter
7 air introduction port
70 nitrogen gas supply source
71 gas valve
72 air supply source
73 gas valve
8 controller
81 input unit
82 memory unit
83 determination unit
84 signal generation unit
9, 9*a* processing chamber
100 film It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An ultraviolet curing method for curing a film coated with a resin by irradiating the film with ultraviolet rays from between two nitrogen gas introduction ports, the ultraviolet curing method comprising:

introducing nitrogen gas from each of the two nitrogen gas introduction ports;

introducing air from an air introduction port between the film and a part for irradiating ultraviolet rays;

measuring an oxygen concentration between the film and the part for irradiating ultraviolet rays;

controlling at least either one of:

an amount of air introduced from the air introduction port, and an amount of nitrogen gas introduced from each of the two nitrogen gas introduction ports, so that the oxygen concentration is within a preset oxygen concentration set range;

guiding the film; and irradiating the film with ultraviolet rays from between the two nitrogen gas introduction ports.

2. The ultraviolet curing method according to claim 1, wherein the control comprises:

inputting the measured oxygen concentration value;

determining whether or not the oxygen concentration value is within the oxygen concentration set range; and generating and outputting a control signal to control a degree of opening of a gas valve on the basis of the determination.

3. The ultraviolet curing method according to claim 1, wherein the oxygen concentration set range is between 500 ppm and 1000 ppm.

4. The ultraviolet curing method according to claim 1, wherein the oxygen concentration set range is between 5000 ppm and 5%.

* * * * *